Figure 1:
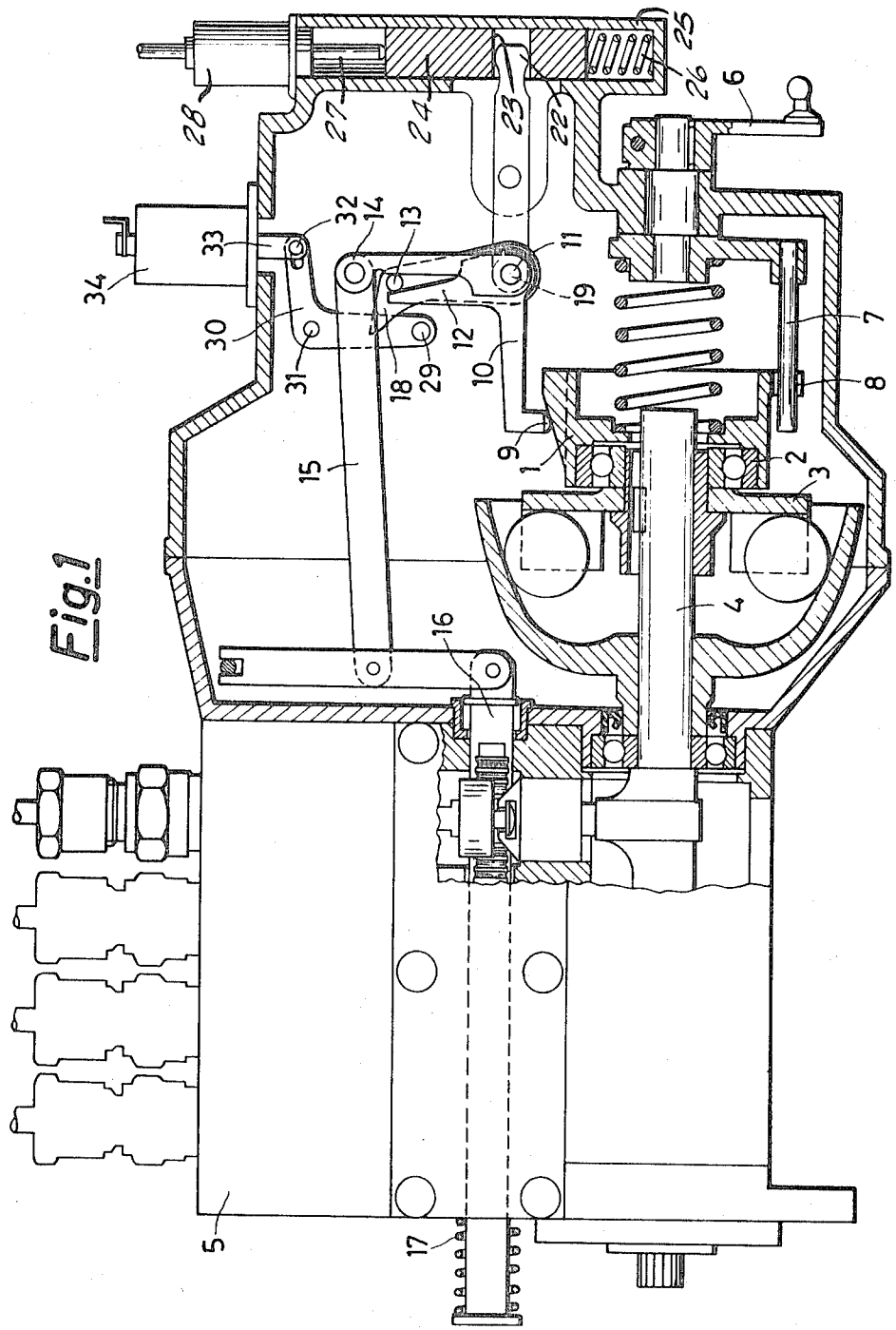

United States Patent
Garcea

[15] 3,640,259
[45] Feb. 8, 1972

[54] REGULATOR FOR GASOLINE INJECTION PUMPS

[72] Inventor: Giampaolo Garcea, Milan, Italy
[73] Assignee: Alfa Romeo S.p.A., Milan, Italy
[22] Filed: June 12, 1970
[21] Appl. No.: 48,861

Related U.S. Application Data

[63] Continuation of Ser. No. 735,332, June 7, 1968, abandoned.

[52] U.S. Cl. ................................123/140 MC, 123/139 AW
[51] Int. Cl. .............................................................F02d 1/00
[58] Field of Search ..................123/119, 140, 140.3, 140.31, 123/179 A, 179 B, 179 L, 139.18

[56] References Cited

UNITED STATES PATENTS 3,015,326  1/1962  Wirsching et al. ..................123/140.31
3,146,770  9/1964  Garcea ..............................123/140.31

FOREIGN PATENTS OR APPLICATIONS 811,904  4/1959  Great Britain ....................123/140.31

Primary Examiner—Laurence M. Goodridge
Attorney—Holman & Stern

[57] ABSTRACT

A regulating device for adjusting the rate of flow of a fuel injection pump for an internal combustion engine as a function of the temperature of the engine at its starting includes a cam and lever system responsive, via a thermostatic element, to the temperature of the engine at the instant of its starting. The device can be adjusted to inject the supplementary amount of fuel necessary for starting the engine properly when the engine is still cold, while the amount of injected fuel can be decreased when the engine to be started, or restarted, is already warm or in the neighborhood of its optimum working temperature.

3 Claims, 3 Drawing Figures

REGULATOR FOR GASOLINE INJECTION PUMPS

This application is a continuation of my prior application Ser. No. 735,332 filed June 7, 1968, now abandoned.

It is known that a few types of regulators for gasoline injection pumps of internal combustion engines have, as an essential component, a three-dimensional cam to whose periphery a follower is in engagement. The cam is automatically displaced with respect to the follower in two different directions as the r.p.m. of the engine and the angle is varied of the throttle angle (or of the feeding pressure), respectively. The end of the follower is then displaced in a direction perpendicular to the two directions above mentioned, consistent with the levels (or "rises") which correspond to the surface of the cam which the follower tracks. A pumping device, for example, the rack, is mechanically connected to the follower for varying the amount of gasoline injected. The levels of the surface of the cam are, of course, provided in such a way that the amount of fuel injected is precisely that required by the engine, consistent with the weight of air drawn, for each couple of values of the two above-stated parameters, viz engine r.p.m. and the position of the throttle (or feeding pressure).

The present regulating device relates to regulating devices of the above type. The regulator as described above affords only a basic adjustment which fulfills the requirements of the engine when the latter is already in a condition of thermal stability. It is known that when the engine is still cold or in any event inadequately heated, the amount of gasoline required for the operation thereof is increased since a portion of the gasoline adheres to the cold walls of the ducts and the cylinders and does not participate in the combustion process.

The present regulating device provides means to correct the regulation for meeting the requirements of an engine not yet in its proper thermal condition. The correction afforded as a function of the engine temperature (in the case of liquid-cooled engines as a function of the temperature of the liquid) is to permit the operation of the engine within the range of powers which does not damage the still cold engine, while inhibiting the engine operation at too high powers which would be detrimental to a cold engine and apt to adversely effect the operability thereof.

The regulating device should thus supply an enrichment of the mixture which can be varied not only as a function of the engine temperature (maximum enrichment at the lowest temperatures, no enrichment at the proper temperatures or at temperatures in the neighborhood of proper temperatures) but also as a function of the power involved (appropriate enrichment with low powers, which is poor and thus inadequate at the higher powers). The latter condition is satisfied by the present device in that, when the engine is not yet in its proper thermal condition, a supplemental amount of fuel is added to the fuel injected according to the base adjustment and the amount of supplemental fuel varies as the engine temperature varies but which is constant in spite of the variations of the above-mentioned basic amount, that is, independent of the power involved. The percent increase and thus the enrichment of the mixture are increased when small powers are involved and are decreased as the power involved is increased. Such a result is achieved by virtue of the linkage provided between the follower and the pumping device which varies the amount of injected fuel, the displacement which corresponds for the latter device to the basic regulation being modified under cold engine conditions, by an amount which varies as a function of the engine temperature (maximum at the lowest temperatures, no change at proper temperatures or in the neighborhood thereof), but being the same irrespective or the displacement which corresponds to the basic regulation.

The present device for providing such an enrichment of the mixture when the engine is not yet in its proper operating condition includes an auxiliary lever having a projection at one end and a displaceable pivot at the opposite end, a movable portion of a thermostat (far sensing the engine temperature) effecting displacements of the pivot and having a considerable component in the axial direction of the lever, a small lever integral with a follower, a second lever in side by side relationship with the auxiliary lever to which a pumping device (e.g., a rack) is connected for varying the amount of injected fuel, and two specially formed surfaces on the small and second levers maintained in contact with the projection on the auxiliary level changes the angle therebetween and determines a variation of the amount of injected fuel.

On the other hand, it is also known that as an engine is being started, the richness of a mixture should exceed that which corresponds to the operability of an already started engine and the further increased in richness should be varied as a unction of the engine temperature. This is tantamount to saying that the colder the engine the more enriched the mixture.

The present invention utilizes the movable portion of the thermostat and the auxiliary lever portion as aforesaid (which to increase the richness of the mixture required for starting an already running, but still cold engine) also for providing to a further enrichment as necessary for starting a cold engine. In other words, the colder the engine, the greater the enrichment. In the present device, the auxiliary lever is rotated during the starting operation, rather than because the projection is thrust by the follower lever (as it is the case when the engine is already running) but because another portion of the auxiliary lever is thrust by a movable member which follows a certain path since it is mechanically connected to an electromagnet which is energized during starting of the engine. The auxiliary lever having a raised portion is formed to provide a planar cam for the part which is allowed to contact the movable member. The profile of such a cam is such that only a portion of the stroke of the movable member is utilized for shifting the auxiliary lever (the remaining part of the stroke is an idle motion) and the portion per se varies consistently with the position imposed by the movable part of the thermostat to the auxiliary lever. The stroke of the electromagnet, which is constant, thus initiates different rotations of the auxiliary lever, consistently with the engine temperature. Thus, different rotations of the lever which is mechanically connected to the pumping device which varies the amount of injected fuel are also initiated.

Figure 2:
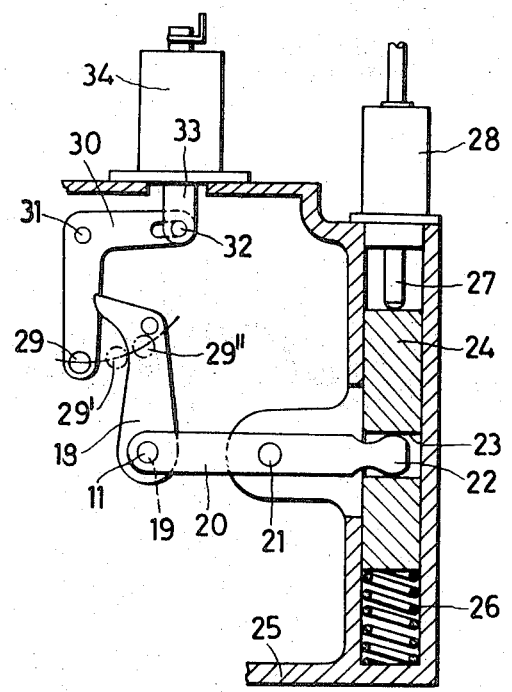
Figure 3:
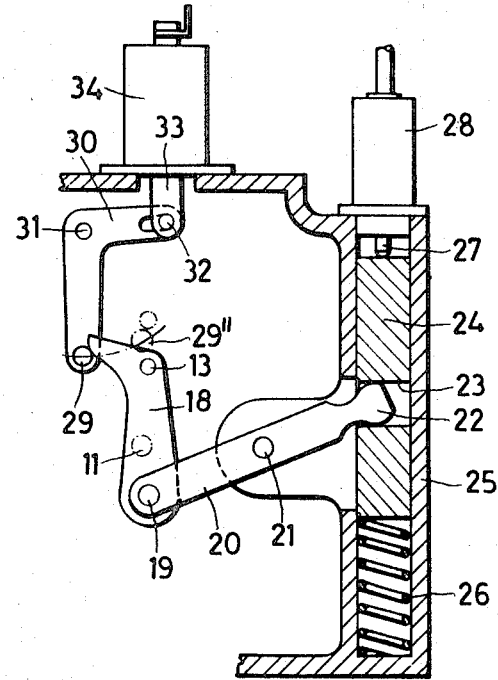

Further objects and advantages of the present invention will become more readily apparent to persons skilled in the art from the following detailed description and annexed wherein:

FIG. 1 is a view partly in elevation and partly in cross section along the axis of the camshaft, and FIGS. 2 and 3 are views partly in elevation and partly in cross section of the adjustment device.

FIG. 1 shows at 1 a three-dimensional cam which is axially connected, by means of a bearing 2, to a movable member 3 of a conventional centrifugal regulator. The regulator is located, in this particular instance, in a specially provided extension of a camshaft 4 which, in the interior of an injection pump 5 moves the fuel-injecting plungers. The angular position of the cam 1 during its rotation on the bearing 2 is a function of the angular position of an external lever 6, since a rod 7 integral with the lever is engaged by a feeler member 10 pivoted at fixed point 11 is provided with an end portion 9 which engages the periphery of the three-dimensional cam 1. A small lever 12 is integral with the feeler member 10 whereby small rotary movements of the feeler member about the fixed pivot 11 effects substantially horizontal movements of the upper end of the lever 12. The horizontal guide 8 which is a part of the cam movements are transferred from the lever 12 through a projection 13 to the upper end of a second lever 14 which also pivots about the pivot 11. The horizontal displacements are transferred by the lever 14 connecting rod 15 to the rod 16 which, in an interior of the pump 5, varies in a conventional manner the amount of fuel injected by the plungers. When the rod 16 is active, a spring 17 constantly biases the rod towards the position of "zero flow" and thus maintains the second lever 14 in contact with the projection 13, and the latter with the small lever 12. The projection 13 is kept in position since it is integral with an auxiliary lever 18. The lever 18 (FIG. 1) has its pivotal point 19 coaxial with the pivot 11 but the pivot 19 is not fixed but can be depressed or displaced so that the projection 13 can also be depressed and slide with respect to the two surfaces $S_1$, $S_2$ with which it contacts the levers 12 and 14 respectively. The relative shape of these two surfaces $S_1$, $S_2$ is such as to give rise to appropriate relative rotations of the second lever 14 with respect to the small lever 12. As the position of the pivotal point 19 is determined as a function of the proper temperature of the engine the colder the engine, the greater the downward movement of the pivotal point 19 with respect to the axis of the pivot 11. In other words, the colder the engine as regards the proper temperature, the greater the corresponding horizontal displacements of the connecting rod 15 and thus the greater the enrichments of the amount of fuel injected. The auxiliary lever 18 is shaped at its upper end to form a local planar cam $S_3$ which can be contacted by projection 29. The projection 29 is integral with a bell crank 30 whose pivotal point is fixed at 31. The bellcrank engages, at 32 a movable core 33 of an electromagnet 34 whose body is fastened to the regulator box. During starting of the core 33 of the electromagnet is fully retracted thereby rocking the bellcrank 30 towards the right about its pivot 31. A fraction of this stroke is lost motion, that is, before the projection 29 engages the cam-shaped profile $S_3$ of the auxiliary lever 18. During the remaining fraction of the stroke, the projection forces the lever 18 through a certain rotation. The lever 18, with the projection 13 effects a corresponding rotation of the second lever 14 which, in conjunction with the connecting rod 15 transfers the displacement to the rod 16 for increasing the amount of fuel injected by the plungers. When the engine is cold, as outlined above, the pivot 19 of the auxiliary lever 18 is depressed by the thermostat 34 and the cam-shaped profile $S_3$ of the auxiliary lever 18, which can contact the projection 29, is such that, as the engine is cold, the idle stroke of the projection 29 is decreased while the portion of the whole stroke during which the projection 29 urges the auxiliary lever 18 is correspondingly increased.

Thus, an appropriately selected cam profile for the lever 18 permits corresponding to the several engine temperatures, rotations of the auxiliary lever 18 which initiate the amounts of injected fuel required by the engine its ready starting at the several above-mentioned temperatures to be obtained. In FIG. 2, the lever 18 is illustrated with the axis of its pivot 19 in alignment with the axis of the fixed pivot 11 of the member 10 and the second lever 14. The feeler member 10 and lever 14 are omitted in the figure for reasons of clarity. FIG. 2 shows the 19 carried by a lever 20 which is provided with a fixed pivot 21. The angular position of the lever 20 is determined by the position of end 22 thereof located a guiding member 23 of a plunger 24 being vertically slidable in the body of a regulator 25. A spring 26 urges the plunger 24 into engagement with a movable portion 27 of a thermostat 28 and the position of the portion 27 varies as the working temperature of the engine varies. It will be seen that the positions of the projection 13, the lever 20, the plunger 24 and the portion 27 correspond to an engine already running at its proper temperature.

FIG. 3 which is generally similar to FIG. 2, illustrates the positions of the corresponding members at a temperature below its operating temperature of the engine.

In FIG. 2, numerals 29' and 29'' denote the position taken by the projection 29 during the active stroke of the electromagnet. The portion 29-29' of the stroke is idle, while the portion 29'-29'' is the stroke portion effects a certain increase of the amount of fuel injected as being necessary for starting an engine still at its steady state temperature. In FIG. 3, on the other hand, with an engine temperature considerably below the steady-state temperature, there is no idle stroke so that the entire stroke 29-29'' is utilized to obtain the maximum amount of injected fuel as required under those particular conditions for starting the engine properly.

The operation of the invention is as follows:

when the running temperature of the engine is normal, the auxiliary lever 18 occupies the position illustrated in FIG. 2. As a conclusion, the correction of the fuel supply rate to the engine is dependent on the running temperature via the displacement of the pivot 19 of such lever thereby resulting in the engagement of the pin 13 with the surface $S_2$ of the second lever 14.

The second correction allowed by the invention relates to the fuel-injection rate correction at the starting of the engine. This correction is effected by acting on the electromagnet 34 which turns the bellcrank about the pivot point 31 and as a consequence, the projection 29 on the end of the bellcrank 30 engages the surface $S_3$ of the auxiliary lever 18 thus moving the pin 13. This particular movement results in a displacement of the second lever 14 and as a result, in a variation of the fuel injection rate to the engine's cylinders. When the engine is running at the lowest temperature, the auxiliary lever 18 is in the position shown in FIG. 3 and the projection 29 of the bellcrank 30 immediately engages the surface $S_3$ and hence the correction required at the starting of the engine is activated through the entire arc of rotation of the projection 29.

However, when, the temperature of the engine is within the normal range (i.e., the starting operation occurs when the engine is already hot), and attention is called to FIG. 2, the correction due to the actuation of the bellcrank 30 is active only after the bellcrank has been rotated through an angle which in turn depends on the position of the auxiliary lever 18 and hence on the running temperature of the engine.

As a matter of fact, at low temperature, (i.e., a temperature between the normal running temperature of the engine as shown in FIG. 2 and the lowest temperature such as −25° C. corresponding to the FIG. 3 position), the correction at the starting of the engine due to the engagement between the projection 29 and the surface $S_3$ is active through a portion of the arc of rotation made by the projection 29, with this portion being lesser than the entire arc but greater than the portion corresponding to the normal running temperature of the engine.

From the foregoing, it will be appreciated that the basic control of the fuel injection is given by the three conventional cam of the type well known in the art, and the present invention provides two further corrections both made primarily dependent on the running temperature of the engine with the first correction varying the fuel injection when the engine is not running at the proper temperature and the second correction varying the fuel injection rate on the starting of the engine.

I claim:

1. In a regulator device for a variable rate of flow for a fuel-injection pump for an internal combustion engine, the three-dimensional cam capable of displacement in two different directions according to the engine r.p.m. and the position of the throttle, a feeler member, a fixed pivot about which said feeler member is rotatable, said feeler member being maintained in contact with the periphery of the cam, and correcting means located between the feeler member and a movable component of the fuel-injection pump serving for varying the fuel flow rate, said correcting means comprising an auxiliary lever, a pivot for said auxiliary lever at one of its ends, with the axis of the pivot being parallel to the axis of rotation of the feeler member and adjacent to the axis, a projection at the other end of said auxiliary lever, said other end having a planar cam, a second lever, a fixed pivot for said second lever having an axis parallel and adjacent the axis of rotation of the feeler member, said projection being located between a surface of the feeler member and a surface of said second lever, means connecting said second lever to the movable component of the fuel-injection pump, means mounting said pivot of said auxiliary lever to be displaceable whereby substantial components of such displacement are in a direction parallel to said two surfaces, the displacements of the mounting means of the pivot of said auxiliary lever being executed as a function of the temperature of said internal combustion engine, the shapes of said two surfaces being such as to contact said projection for originating and increasing the rate of flow as is necessary under cold engine conditions with respect to the rate of flow corresponding to an engine running under proper conditions, a movable member, an electromagnet mechanically connected to the movable member, with said electromagnet being energized during starting of the engine whereby the auxiliary lever rotates due to said movable member contacting the planar cam, the stroke of the movable member contacting the planar cam, the stroke of the movable member being constant and the profile of the planar cam being such that only a portion of the stroke of the stroke of the movable member is used for shifting the auxiliary lever with such stroke portion and thus the rotation of the auxiliary lever being a function of the displacements of the mounting means of the pivot of the auxiliary lever and thus of the temperature of the engine, and said rotation of the auxiliary lever dispensing an amount of injected fuel during the starting of the engine with such amount also being a function of the engine temperature.

2. The regulator device as claimed in claim 1 in which the displacement of the mounting means of the pivot of said auxiliary lever is controlled by thermostatic means.

3. The regulator device as claimed in claim 1 in which the displacement of the mounting means of said pivot of said auxiliary lever is manually controlled.

* * * * *